US006220079B1

(12) United States Patent
Taylor et al.

(10) Patent No.: US 6,220,079 B1
(45) Date of Patent: Apr. 24, 2001

(54) ANNULAR FLUID MANIPULATION IN LINED TUBULAR SYSTEMS

(75) Inventors: Jack Curtus Taylor; Jerry Max Roach, both of Conroe, TX (US)

(73) Assignee: Safety Liner Systems, L.L.C., Conroe, TX (US)

( * ) Notice: Subject to any disclaimer, the term of this patent is extended or adjusted under 35 U.S.C. 154(b) by 0 days.

(21) Appl. No.: 09/353,300

(22) Filed: Jul. 13, 1999

Related U.S. Application Data

(60) Provisional application No. 60/093,665, filed on Jul. 22, 1998.

(51) Int. Cl.[7] ............................ G01M 3/02; G01M 3/08; G01M 19/00

(52) U.S. Cl. .......................... 73/37; 73/40.5 R; 73/865.8

(58) Field of Search .................................. 73/37, 40.5 R, 73/865.8; 175/25, 215; 439/194; 166/313

(56) References Cited

U.S. PATENT DOCUMENTS

| | | | | |
|---|---|---|---|---|
| 4,676,563 | * | 6/1987 | Curlett et al. | 439/194 |
| 4,683,944 | | 8/1987 | Curlett | 166/65.1 |
| 4,756,339 | | 7/1988 | Buluschek | 138/115 |
| 4,836,305 | * | 6/1989 | Curlett | 175/215 |
| 4,924,949 | * | 5/1990 | Curlett | 175/25 |
| 4,965,036 | | 10/1990 | Miyazaki et al. | 264/269 |
| 5,072,622 | | 12/1991 | Roach et al. | 73/40.5 |
| 5,454,419 | | 10/1995 | Vloedman | 166/277 |
| 5,497,809 | | 3/1996 | Wolf | 138/113 |

* cited by examiner

*Primary Examiner*—Hezron Williams
*Assistant Examiner*—Jay L. Politzer
(74) *Attorney, Agent, or Firm*—Felsman, Bradley, Vaden, Gunter & Dillon, LLP

(57) ABSTRACT

A lined tubular system and method provides for the manipulation and control of annular fluids tubular and the liner. This structure allows for profiling of the exterior wall of a liner such that one or more continuous channels are provided along the length of the lined tubular system. The system may also include one or more non-crushable members or tubes between the liner's exterior surface and host tubular's interior surface. Rounded, granular particles in the annulus between liner and host may provide an alternative path for fluid flow. The particles may be uniformly or randomly distributed in the annulus.

11 Claims, 13 Drawing Sheets

ANNULAR FLUID MANIPULATION IN LINED TUBULAR SYSTEMS

This application claims the benefit of U.S. Provisional Application No. 60/093,665, filed Jul. 22, 1998.

FIELD OF THE INVENTION

The present invention relates generally to the field of oil field tubulars and, more particularly, to a method and structure for providing multiple conduits in a drilling pipe through the use of a pipe liner.

BACKGROUND OF THE INVENTION

Well drilling operations generally comprise the steps of connecting drill pipes to form a drill string and rotating the drill string to turn a drill bit thereby abrading the earth formation. In other cases, non-rotating coiled tubing with an electrically or hydraulically operated drill may be used. In any case, during drilling operations, operators must measure various drilling parameters such as drilling formation, inclination, temperature, PH and the like. Instantaneously sensing, measuring, transmitting, and detecting such parameters has been a problem, in part because the drill string rotates and the parameter being measured is often thousands of feet below the earth's surface.

Commonly, drilling mud is pumped downwardly through the drill pipe to cool, lubricate, and flush cuttings from the drill bit. The mud is then returned to the surface in the annulus around the drill string. The cuttings entrained in the return mud may then be analyzed to determine the type of formation that the drill bit is encountering at that time. Drilling operations may then be altered to more efficiently drill through that type of formation.

It has been recognized in the art that providing multiple channels for conducting drilling mud to the drill bit and to the surface can enhance the effectiveness of returning drill cuttings to the surface. One structure for accomplishing this includes a dual passage drill pipe including inner and outer concentric pipes.

For example, the most efficient drilling operation occurs when the characteristics of the formation are known to the drilling operator. For different types of formations, such as rock, soil, shale, sandstone, or other types, it may be desirable to alter the surface operations to effectively deal with the type of formation in which the drill bit is presently encountering. Traditionally, the formation chips eroded by the drill bit are carried uphole in the annulus around the drill string by fluids pumped downwardly through the drill pipe. The inspection of these chips, however, provides only unreliable information of formation presently being drilled, as it may take a substantial period of time for the chips the ascend to the surface. Non-concentric, multi-conduit drill pipe may also be used to increase the number of conduits. Such pipes have not found widespread application for a number of reasons. One drawback encountered in connecting such pipes together is the manner in which the conduits of one pipe are sealed to the conduits of another pipe. Conventional sealing arrangements can limit the pressure of operating of such a system.

Further, there is a need to monitor downhole drilling parameters, instantaneously transmit the parameters to the surface, commonly by an electrical conductor. The conductor must be combined with the drill pipe in such a way that the drilling mud carrying capability is not compromised. One structure that has been proposed to accomplish this uses the central bore of the drill pipe as a chamber in which an electrical conductor is run. However, the conductor insulation is subjected to the aggressive nature of drill fluid, or expensive shielding must be used.

Another problem with the use of electrical conductors in the fluid-carrying bore is the isolation of the connections of lengths of conductor from the drilling fluids. This problem is exacerbated because the drill pipe is rotating, and none of the proposed solutions has proved entirely satisfactory.

Even after the drilling operation has been completed, there is a need to monitor downhole parameters during the production phase for well management purposes. Conventional well casings have heretofore afforded a high degree of integrity to the well bore, but are ill-equipped to provide passageways for wires, gasses or liquids other than the fluid pumped upwards. As a stopgap measure, telemetry wires have been secured to the outer periphery of the casing by metal or plastic bands and extended downhole to telemetry equipment. It is also well known to provide parasitic pipes external to the casing for carrying air pressure to create artificial lift downhole.

Casings have been lined previously, as shown in Vloedman, U.S. Pat. No. 5,454,419. In this case, the lining provides corrosion protection and is used to patch the primary casing. The system may also be used for production conduit, but makes no allowances for channels between the lining and a host tubular.

Curlett, in U.S. Pat. No. 4,683,944 proposed a solution to the need for multiple conduit drilling pipe. Curlett teaches a plurality of conduits distributed uniformly throughout the drill pipe and thus uniformly across tool joints. The conduits extend axially through the drill pipe, from one of the drill pipe to the other. Such a structure shows promise in solving the problems in the art just described, but suffers from two drawbacks, in that the manufacture of the drill pipe is far more expensive than drill pipe without the multiple conduits, and the ultimate torsion strength of the drill pipe or the same wall thickness is lessened.

As a result, there is a need for multi-conduit well tubular and/or casing through which the production fluid can be pumped, as well as a plurality of additional conduits for housing telemetry wires and other uses, which drill pipe does not add significantly to manufacturing costs and which retains the torsional strength of the drill pipe of a predetermined wall thickness.

Pipe and other tubulars have been lined with polymeric liners (e.g., polyethylene, nylon 11, etc.) for many years and several installation techniques are known to the art. These systems have been used principally in offshore and onshore pipelines, and in downhole production tubulars. The application of such liners has generally been limited to corrosion and erosion protection. However, they have also been used in monitoring for integrity of the composite liner-host system, as shown by Roach and Whitehead in U.S. Pat. No. 5,072,622, incorporated herein by reference.

Roach and Whitehead taught a lined pipe with it least one groove located in the exterior surface of the liner. The at least one groove was in communication with a leak detection system, and was maintained at a vacuum to detect leakage by variation in the vacuum. Further, all of the grooves in the liner were linked together with cross passages so that no one of the grooves was isolable from any other groove. Thus, the system of Roach and Whitehead was not adaptable to provide downhole channels for the conduction of fluids, or to provide channels for non-crushable members such as electrical conductors, tubulars, and the like.

In other known liner systems, the liner resides in close-tolerance with the host pipe along its length, forming a stable composite system. The installed liner may be either loose-fit or compressed-fit. In all but low pressure applications, the stresses induced by fluid pressure from within the liner are transmitted to the surrounding host tubular and the host tubular resists these transmitted stresses. The liner acts as an intermediary layer.

A variety of techniques for lining pipe are currently in use, but each generally involves temporarily reducing the outside diameter of the liner to less than the inside diameter of the host tubular, pulling the liner into the host tubular, then permitting the liner to expand into abutting contact with the inside surface of the host tubular.

However, if the liner configuration could be modified from its usual uniform cylindrical shape, then a number of possibilities are presented, including the formation of multiple conduits between the liner and the host tubular. This structure thus suggests a relatively inexpensive technique for providing multiple conduits within a drill pipe, while retaining the torsion strength of the drilling pipe since the conduits do not go through the drill pipe itself.

SUMMARY OF THE INVENTION

The present invention addresses these and other needs in the art by expanding the scope of applications for liners to manipulation and control of annular fluids within the lined tubular systems. Further, the invention provides for a continuous annulus along the length of plastic-lined tubular and any intermediary joints, if applicable, through necessary couplings across such joints.

The preferred embodiments of the invention are of three types. The first embodiment allows for profiling of the exterior wall of a liner such that one or more continuous channels are provided along the length of the lined tubular system. The second embodiment allows for the introduction of one or more non-crushable members or tubes between the liner's exterior surface and host tubular's interior surface. The third embodiment includes the incorporation of generally rounded, granular particles in the annulus between liner and host,. The particles may be uniformly or randomly distributed in the annulus.

These and other features and objects of this invention will be apparent to those skilled in the art from a review of the following detailed description and the accompanying drawings.

DETAILED DESCRIPTION OF PREFERRED EMBODIMENTS

As previously described, pipes have been lined in the past to prevent erosion or corrosion. Advantages have also been shown by providing a drilling pipe with a plurality of channels. However, this is believed to be the first time that a pipe liner has been contoured to provide a plurality of channels for applications as herein described.

Figure 1:
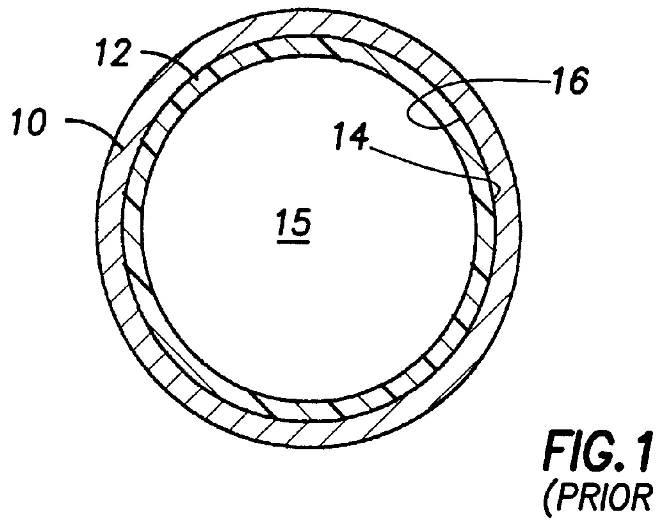
FIG. 1 (PRIOR ART)
FIG. 1 is a section view of a prior art tubular lined with a liner.

FIG. 1 depicts a typical known lined tubular. The combination comprises a tubular 10 with an installed liner 12, with an exterior surface 14 of the liner in tight engagement with an interior surface 16 of the tubular. Within the liner 12 is defined an interior volume 15, such as for the conduction of drilling mud and the like. The liner may be loosely or closely fitted within the tubular. In the prior art liner of FIG. 1, the liner is a substantially smooth, continuous cylindrical liner, and has proven to be very successful for applications to protect in interior surface 16 of the tubular.

The present invention, however, preferably involves contouring the exterior surface 14 of the liner. In other cases, described below, involves deforming the liner to form channels.

Figure 2A:
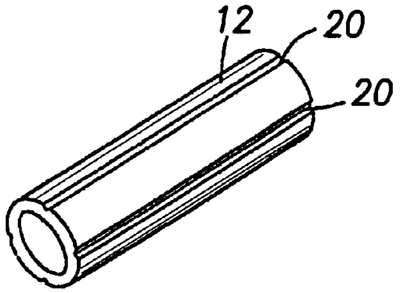
FIGS. 2*a*, 2*b*, and 2*c* are perspective views of liners profiled with a plurality of channels, in accordance with this invention.
Figure 2B:
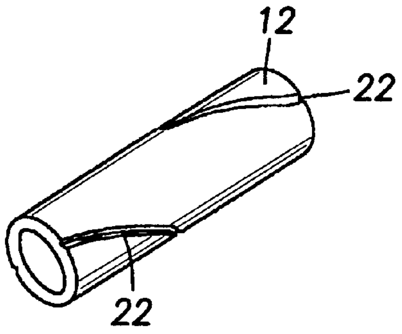
Figure 2C:
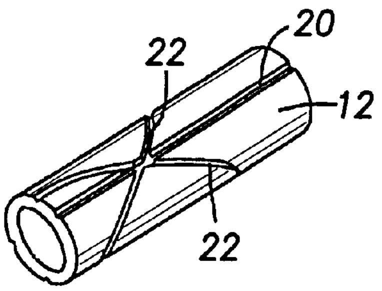

FIGS. 2*a*, 2*b*, and 2*c* illustrate such contoured liners 12. In FIG. 2*a*, a plurality of channels 20 are formed in the liner 12, as by extruding. In this case the channels 20 are equally spaced around the exterior surface of the liner, and are parallel to the axis of the liner. The present invention, however, includes the use of any number of channels, even only one such channel, whether straight down the liner or curved around the liner.

FIG. 2*b* depicts a helical shaped channel 22, which may also be formed by extruding. FIG. 2*c* shows the use of a combination of helical channels 22 and straight channels 20.

Figure 3C:
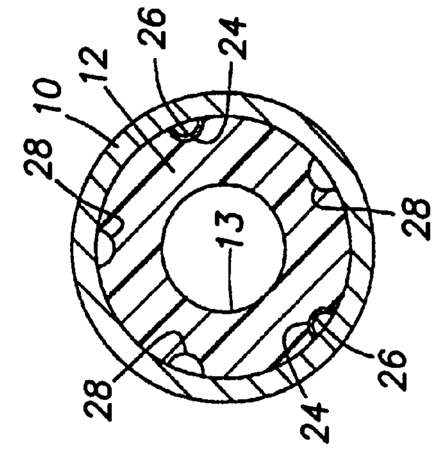
FIGS. 3*b* and 3*c* are end section views of a lined tubular with one channel and a plurality of channels, respectively, with some of the plurality of channels being reinforced.
Figure 3B:
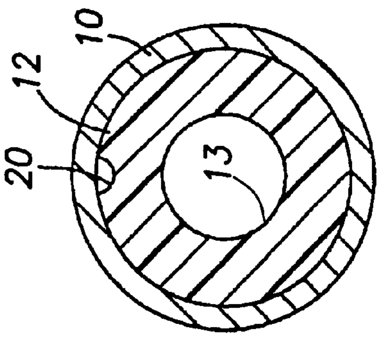
Figure 3A:
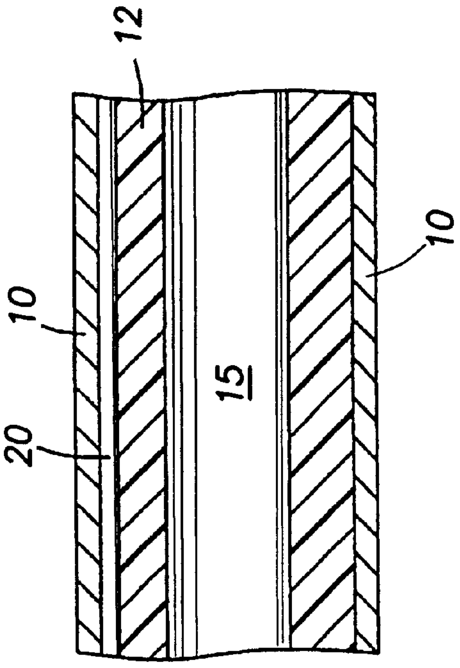
FIG. 3*a* is a side section view of a lined tubular with a channel in the liner.

FIGS. 3*a*, 3*b*, and 3*c* show the liners of FIGS. 2*a*, 2*b*, and 2*c* within a tubular 10. In this embodiment, one or more of the channels 20 or 22 in the liner can also be reinforced with a reinforcement 24, as in a channel 26, or they may be simply left unsupported, as in a channel 28. In either of FIGS. 3*b*, or 3*c*, an interior surface 13 of the liner 12 is substantially circular in cross section.

The geometry or cross-sectional shape of a channel may be selected according to individual preference, use or the channel, and manufacturing capability. A number of such profiles are shown in FIG. 6, such as a circular channel 30, triangular channel 32, square channel 34, partial hexagonal channel 36, and trapezoidal channel 38, all of which (and any other appropriate cross-sectional shape) are within the scope and spirit of this invention.

Figure 4C:
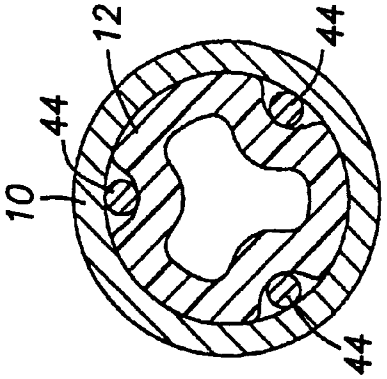
FIGS. 4*b* and 4*c* are end section views of a lined tubular with one channel and a plurality of channels, respectively, with non-crushable members between the liner's exterior surface and the host tubular's interior surface.
Figure 4B:
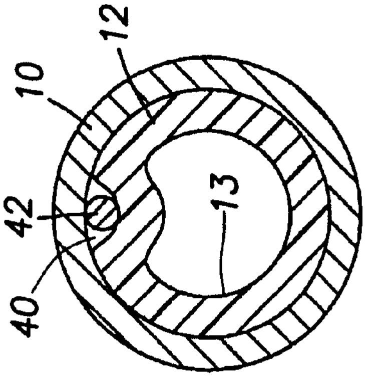
Figure 4A:
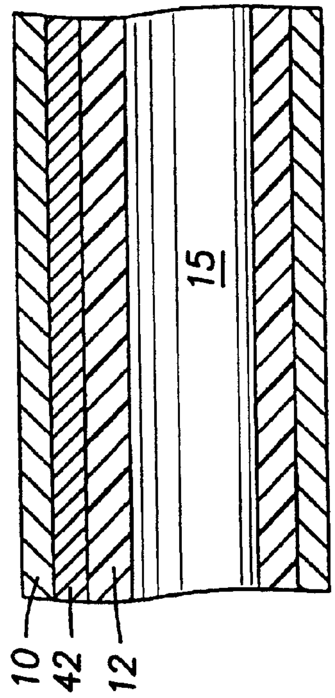
FIG. 4*a* is a side section view of a lined tubular with a tubular, conduit-type channel in the liner.

In place of or in addition to the provision of reinforced or non-reinforced channels in the liner, one or more non-crushable members may be located in the system annulus, as shown in FIG. 4*a*, 4*b*, and 4*c*. In this case, within the a channel 40 is a conduit 42. The non-crushable member may also comprise an electrical conductor 44, as described above. Note also that in the embodiment depicted in FIG. 4*c*, the electrical conductors 44 may provide three-phase electrical power to down hole equipment.

Figure 6:
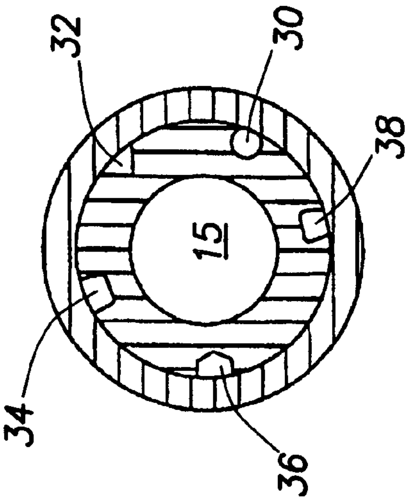
FIG. 6 is an end section view of a lined tubular illustrating that the channel in the liner can have any appropriate configuration.

The liner may either be profiled as shown in FIG. 3*a*, 3*b*, and 6, or it can be essentially smooth surfaced. In the case of the smooth surfaced liner, the non-crushable member forms the channel 40 in the liner by deformation, and the interior surface 13 of the liner is no longer substantially circular in cross section, but rather conforms to the non-crushable member.

Figure 7:
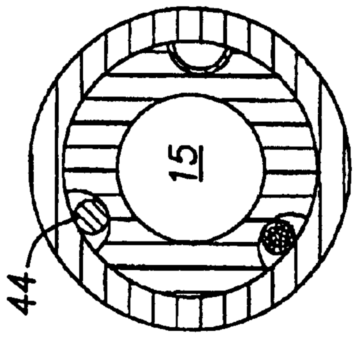
FIG. 7 is an end section view of a lined tubular with non-crushable members or conductors in channels, such as; solid rod, braided cable, or channels and tubulars.

The non-crushable members, such as conduits 42 or conductors 44, may be situated in the host tubular prior to the insertion of the liner, or they may be inserted along with and at the same time as the liner. They may be affixed to the host tubular and/or the liner, but need not be adhered to either. In the case of a profiled liner, they may be situated in one or more of the plurality of channels or depressions, as shown in FIG. 7, or any combination of profiled channels and deformation channels.

The geometry of the non-crushable members may be varied according to individual preference or specific need. However, as a practical function, the geometry of such a member should not induce a stress riser which is harmful to the liner or the host under expected operating conditions. Accordingly, it may be preferred that the area of the non-crushable member in contact be of a rounded shape or of a shape to conform to either or both of the host tubular and the liner.

Figure 8:
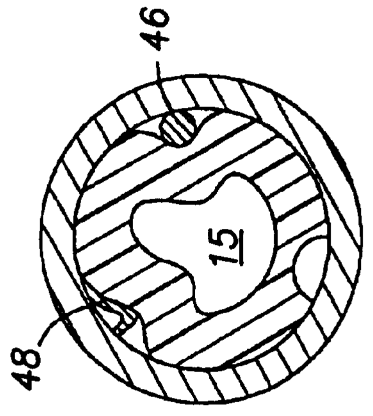
FIG. 8 is an end section view of a lined tubular with non-crushable members, such as a helical spring, or conductors in channels, where the non-crushable members are placed between a non-channeled liner and a host tubular to form the channel by deformation of the liner.
Figure 9E:
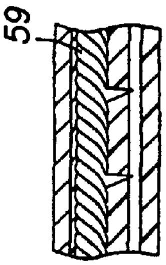
FIGS. 9*a* through 9*e* are side section views, illustrating various components in the channel of the liner.
Figure 9D:
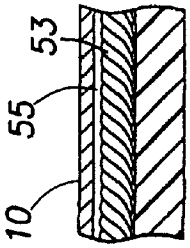
Figure 9C:
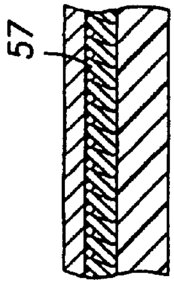
Figure 9B:
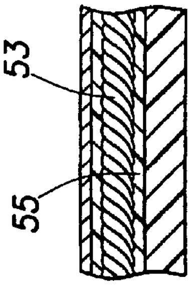
Figure 9A:
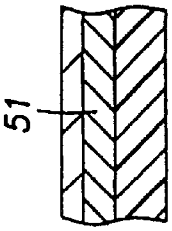

As shown in FIG. 8, the non-crushable member may comprise a cable 46 or an angle spring 48. In FIGS. 9*a* through 9*e*, a variety of non-crushable members, such as cables or springs, are included between the host tubular and the liner. The member, when situated in the composite liner-host system, creates at least one channel by deformation, dependent upon geometry, when the liner is installed. In FIG. 9*a*, a solid rod 51 deforms the liner to form the channel. In FIG. 9*b*, an electrical cable 53 deforms the liner, and includes an insulative barrier 55. In FIG. 9*c*, a helical spring 57 is used, which in FIG. 9*d* an electrical cable 53 is used, but the insulative barrier is adjacent the host tubular 10. FIG. 9*e* depicts a combination, where an electrical cable 53 deforms the liner, but an adjacent channel 59 is also included.

Figure 5C:
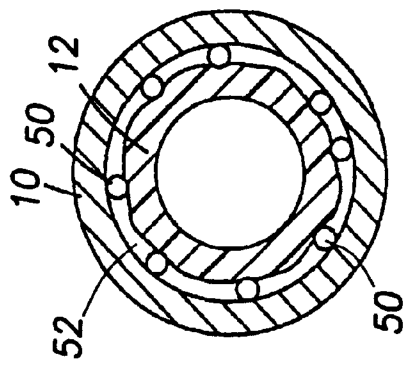
FIGS. 5*b* and 5*c* are end section views of the embodiment of FIG. 5*a*, with 5*b* depicting pebbling of the outer surface of the liner, and 5*c* depicting free granules between the liner and the host tubular.
Figure 5B:
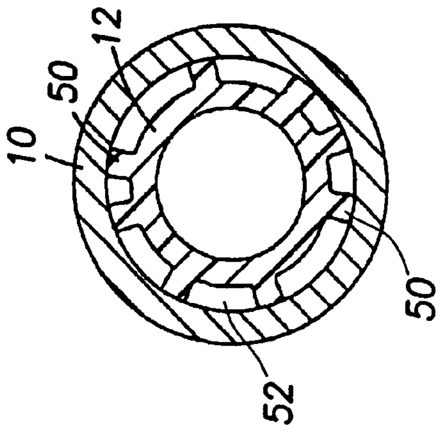
Figure 5A:
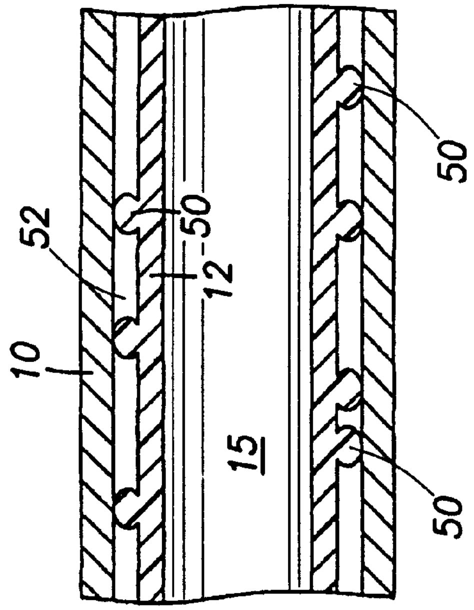
FIG. 5*a* is a side section view of a lined tubular with rounded, granular particles in the annulus between liner and host.

FIGS. 5*a*, 5*b*, and 5*c* depict another feature of this invention. In this embodiment, relatively small, rounded, non-crushable particles are located within the annulus between the host tubular and the liner to create a pebbling effect. Correctly positioned, these particles maintain annular continuity by holding the liner away from the host tubular, thus permitting the flow of fluids therein. As in the previously described embodiments, the particles should not induce a harmful stress riser.

Such an effective embodiment may be created by several methods, as shown in FIG. 5. Irregularities, such as particles 50, on the outer surface, as shown in FIGS. 5*a*. and 5*b*, of the plastic liner may be fabricated in the liner's production process via controlled extrusion or adhesion. In another method, the irregularities may be introduced onto the plastic liner outer surface post-production, via adhesion or fusion. Alternatively, they may be integrated with the inside surface of the host tubular. In any of these alternatives, the structure provides multiple non-contiguous irregularities created on the outer surface of the liner for fluid flow in the annulus.

The particles need not be integral with either the plastic liner or the host tubular to achieve the desired effect, however. Particles 50 may rather simply be located within the annulus, as shown in FIG. 5*c*. For example, the particles may be introduced into the host tubular at the time of insertion of the plastic liner, with the dragging motion of the liner during the insertion process distributing them to their individual resting places. Alternatively, they may be pumped or blown in prior and/or during the insertion process.

When properly situated, the particles 50 create gaps 52 at the liner-tubular interface, effectively creating pathways for fluid flow, irregular in nature, but continuous nonetheless.

Figure 10:
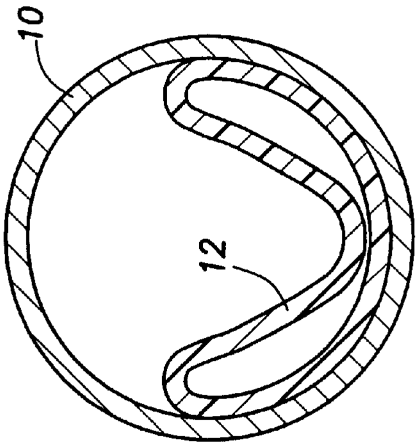
FIG. 10 is an end section view of a tubular in which the liner has radially collapsed.

Another advantage of the invention is the overcoming of system failure due to liner collapse, which is depicted in FIG. 10. This collapse is most often triggered by the buildup of annular fluids which have permeated or diffused through the liner from within the system. Such fluids may exist in either gas or liquid phase dependent upon conditions in the annulus. For the most part, an equilibrium is in effect; the internal fluid pressure is generally greater than or equal to the annular pressure. However, in the course of normal operations, internal pressure may be reduced to substantially less than the annular fluid pressure, for example in a shutdown. The resulting pressure differential may allow an expansion of the annular fluid to occur as the pressures attempt to equalize. This is particularly true if the liner is unable to withstand the external stress on its own, and radial buckling results. This collapse within the host tubular nullifies the composite system's functionality.

In liner systems known to the art, mechanisms to vent annular fluids have been inadequate to prevent liner collapse on a robust basis. Typically, the liner outer surface maintains a significant degree of contact with the inner host wall, as shown in FIG. 1. This geometry makes for a significant degree of sealing. The annular cross sectional area is thus reduced to the extent that only an extremely tortuous path for the annular fluid's migration toward any venting mechanism along the system exists, i.e., and this mechanism cannot be relied upon to release pent-up pressure in the annulus between the liner and the host tubular. Generally, current liner systems' inherent annular pressure relief capability is inversely proportional to distance between vents, and to the degree of sealing. The latter variable is essentially a function of the liner and host materials, their surface properties, fluid constituents, and operating variables such as pressure and temperature.

The onset of the liner collapse phenomenon is dependent upon inter-related variables, which include differential pressure. Other contributors to the onset of liner collapse include the liner's "apparent" mechanical properties, the nature of the fluid transported, pressure, temperature, and the effective rate of fluid permeability.

Adequate removal of annular fluids minimizes their contributory effect towards liner collapse. Stress and strain criteria required to cause a radial buckling collapse must therefore be gained solely by other factors such as absorption swell, temperature, etc., which are generally insufficient by themselves, without pressure differential, to cause collapse.

Figure 11:
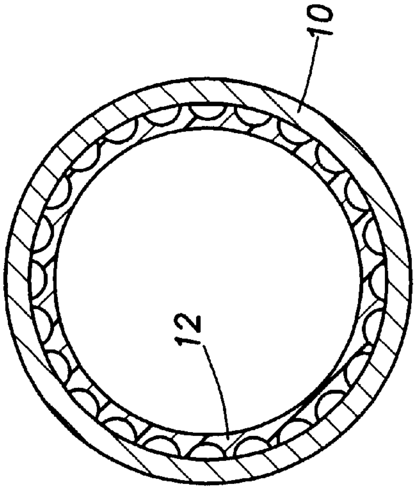
FIG. 11 is an end section view of a tubular with a profiled liner.

The continuous annulus provided for in this invention, provides the ready evacuation of annular fluids, thus minimizing the potential for liner collapse, particular for composite liner systems such as those depicted in FIG. 11.

Figure 12A:
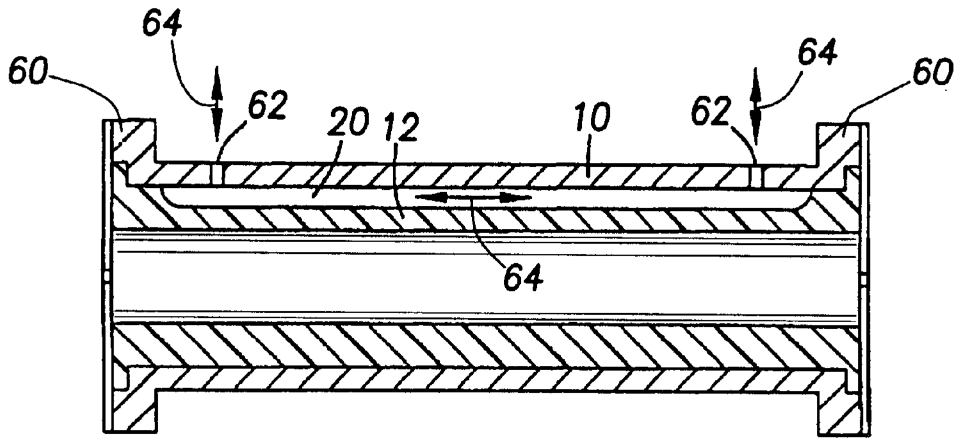
FIG. 12*a* is a side section view of a tubular with a liner in which the tubular includes ports for reduction of annular fluids.
Figure 12B:
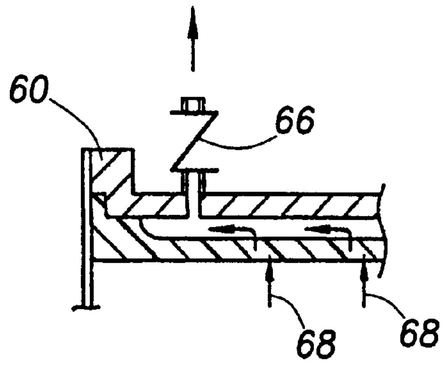
FIG. 12*b* is a side section view of a tubular with a liner in which the tubular includes a check valve at a port for control of annular fluids.

Reduction of the annular fluids may be accomplished by active or passive means. In the simplest case of the invention, the liner provides free venting of annular fluid to the environment, as shown in FIG. 12*a*. The composite liner system of FIG. 12*a* includes the host tubular 10 and liner 12, as before. The host tubular and liner are sealed together at each end at a flange 60. Near each end of a representative channel 20 is a vent hole 62 to permit fluid to enter and exit the channel 20 in the annulus. As shown by arrows 64, fluid is permitted to flow in either direction throughout the system, and in each instance the flow is driven simply by differential pressure.

Adding complexity, a check valve 66 may be employed to control annular pressure within a range differing from both the environment and within the liner, as shown in FIG. 2*b*. Such a valve permits continuously permeating annular gases to vent, maintaining the annulus at a relatively benign pressure, the gases permeating as shown by arrows 68.

Figure 12C:
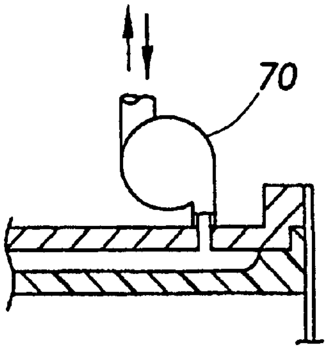
FIG. 12*c* is a side section view of a tubular with a liner in which the tubular includes a pump at a port for reduction of annular fluids.

In a slightly more complex embodiment, a pump 70, either vacuum or positive pressure, may be connected to the annulus to control the fluid pressure to a greater degree, as shown in FIG. 12*c*. Installed with a sensing system (not shown), it may facilitate the system described in the Roach-Whitehead patent, U.S. Pat. No. 5,072,622, mentioned previously. Fluids in the annulus may be of gas, liquid, or a mixed phase, depending upon the inter-relationship between materials, fluid conveyed, and operating conditions.

Figure 13A:
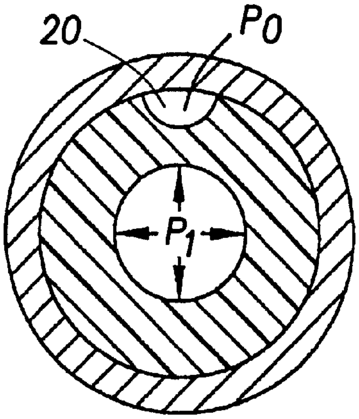
FIGS. 13*a*, 13*b*, and 13*c* are end section views of a lined tubular illustrating liner behavior under various operating pressures.
Figure 13B:
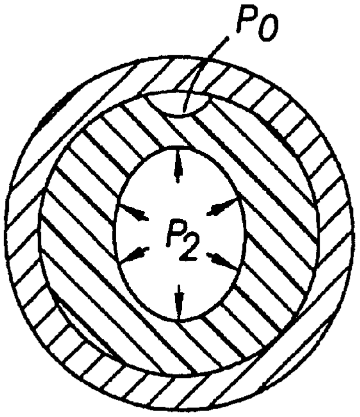
Figure 13C:
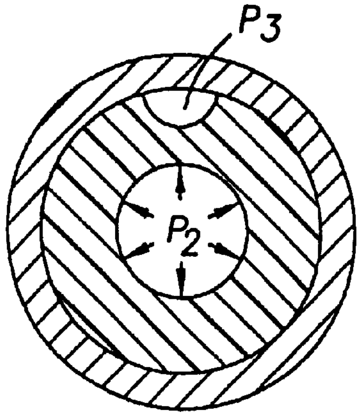

When composite liner-host systems are operated at relatively high pressures, the annular pathway(s), as described above, may be reduced in cross-sectional area. FIGS. 13*a*, 13*b*, and 13*c* depict a series of end section views illustrating liner behavior under various operating pressure modes. In FIG. 13*a*, the interior pressure $P_1$ is greater than the annulus pressure $P_0$, by an amount which will not cause significant distortion to the liner. Thus, the channel 20 dimension is the design dimension. In FIG. 13*b*, pressure $P_2$, is much greater than $P_1$ (and thus annulus pressure) (i.e., $P_2 << P_1$) and thus the channel 20 dimension is substantially reduced. This reduces the effectiveness of the invention.

Annular fluid pressure may be increased to offset this reduction, provided the pressure differential between the annulus and the interior of the system is maintained at a level insufficient to initiate the collapse, as shown in FIG. 13*c*, where the annulus pressure $P_3$ has been increased to offset the higher interior pressure $P_2$.

It may, however, be desirable to use a non-compressible fluid in the annulus. Such a fluid, by its very nature, will inhibit the reduction of the annular pathway(s) cross-sectional area. Also, upon system depressurization, annular liquid will not induce liner collapse as it will not expand sufficiently to contribute to buckling. In this case, annular and internal pressures are effectively equalized at all times. The permeation potential is mitigated as the differential pressure is minimized. Correspondingly, the amount of fluid permeating the liner is minimized. With such fluids potentially being of a compressible nature, they are able to contribute to liner collapse ashen present upon system depressurization.

Further, it may be desirable to use a certain type of non-compressible annular fluid, specifically, a liquid relatively insoluble with respect to the interior fluid's ingredients that most readily permeate through the liner. Accordingly, very little permeant, particularly of a gas phase, will be able to dissolve into such annular liquid. Then, upon annular depressurization, little evaporation will occur. The phase change from liquid to gas is particularly undesirable as it corresponds to a relatively large increase in annular fluid volume, contributing significantly to liner collapse.

Such annular fluids should not be detrimental to the liner or host pipe. However, such fluids should be stable at typical operating temperature and pressure conditions. Examples of satisfactory annular fluids include hydraulic oil, brake fluid, etc.

Figure 14:
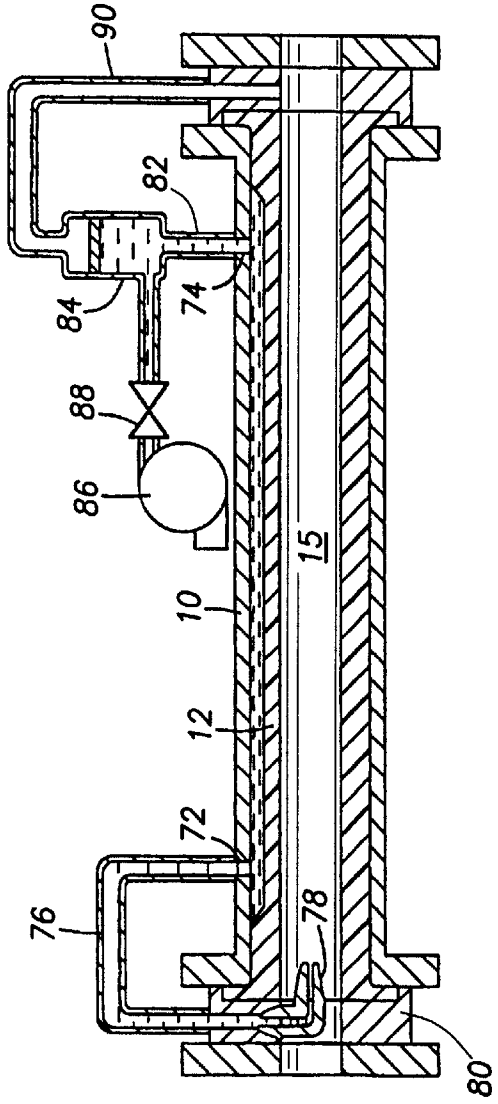
FIG. 14 is a side section view of a lined tubular of this invention with structure for the circulation of annular fluid, whereby the pressure in the annulus will not become great enough to collapse the liner.

As shown in FIG. 14, the continuous annulus of this invention may also be used to circulate the annular fluids, and this circulation provides several benefits. The host tubular 10 is provided with an opening 72 and an opening 74. The opening 72 is connected to a recirculating line 76 which terminates at a nozzle 78 within the interior volume 15. The recirculating line 76 may penetrate into the interior volume through a fitting such as a flange 80. The opening 74 is connected to a stub pipe 82 which is connected to a surge tank or accumulator 84. The surge tank is connected to a pump 86 through a shutoff valve 88. The surge tank is also coupled to the interior volume 15 through a recirculation line 90, such as for example through a flange 92.

The system shown in FIG. 14 provides for recirculation of fluid, which lends a number of advantages. First, as related to the non-compressible fluid cases described immediately above, circulation provides for substitution of annular fluid. On a controlled basis, annular fluid contaminated by permeated fluids, e.g., liquid with gases in solution, may be exchanged with new annular fluid. The net effect is less expandable fluid in the annulus which reduces the possibility of the collapse of the liner 12.

Next, circulation of annular fluid will (confirm the functionality of the annular pathway(s), and hence monitor the integrity of the invention. If the annular fluid fails to circulate, it is unable to provide benefits intended.

Figure 15A:
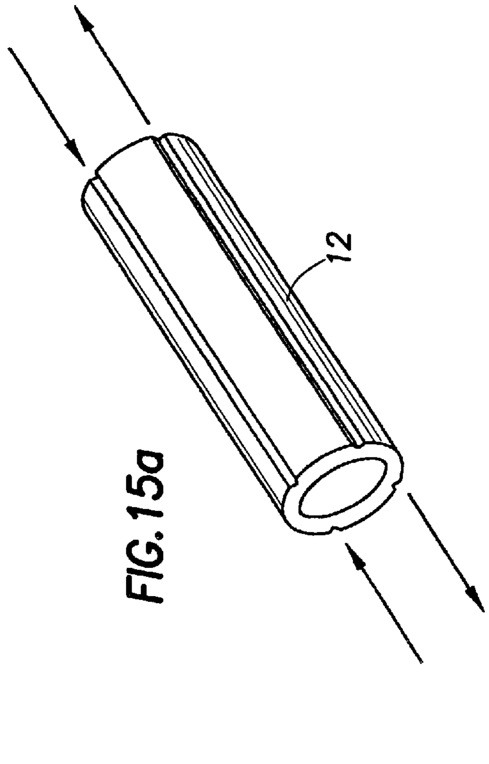
FIGS. 15*a* and 15*b* are perspective views of a liner illustrating bi-directional flow of fluid in channels of the liner.
Figure 15B:
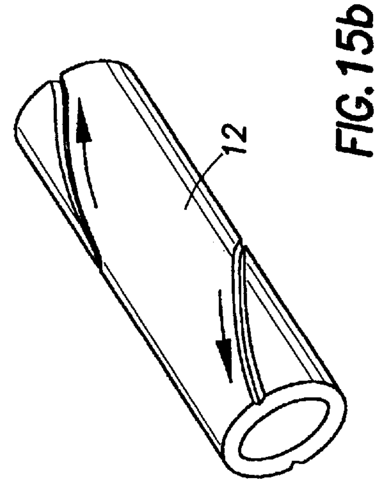

Also, fluid may be injected at one end of a lined tubular system, along an annular fluid path(s). The geometric configuration at the opposite end may provide for the return of the same fluid from a different, and isolated fluid path(s) in bi-directional flow, as shown in FIGS. 15*a* and 15*b*. Accordingly, if such fluid flow is measurable upon return, the operator can be assured that the continuity of the annulus is maintained, thus the expanded functionality of the liner is preserved.

Such an annular circuit may also act as a monitoring system for the integrity of the composite system. In the event of a breach in liner and/or host pipe, annular fluid circulation may be diminished or lost, or the returned fluid may contain telltale constituents. Each of these cases would indicate a loss of system integrity. If a host wall integrity is suspect, detection fluids, such as mercaptans or dyes, may be injected into the annular fluid stream, facilitating problem location by remote reconnaissance.

As another benefit of the continuous annulus, specific fluids may be introduced at one end and then directed into the primary, internal fluid stream at the remote end. In one embodiment, a port (e.g., venturi orifice 78) at the remote location allows introduction of the fluid, as shown in FIG. 14. Such fluids may include methanol (for hydrate prevention), solvents (for scale prevention), etc. In practice, for example in offshore energy production flowlines or saturated gas production tubular applications, this facility may eliminate the need for provision, respectively, of costly accompanying service lines or heat tracing facilities.

It may be desirable to limit the pressure of the annular fluid to the lowest value of the fluid-in-transit, typically the exit pressure, in order to minimize the chance of liner collapse in the event of a line depressurization. This may be accomplished by the use of the control valve 88, and/or the hydraulic accumulator system 84, installed at the exit, which are in communication with both the annulus and the system's interior.

The control of fluid through a continuous annulus facilitates remote communication capability. Acoustic and/or pressure waves may be transmitted through the annular fluid to the remote end of the lined tubular system as a signal. The insulating and/or dampening effect of the liner well mitigates signal interference from the main flowstream within. Improved data transmission and acquisition rates, and interpretation accuracy result, particularly using certain liquid annular fluids. Such a system has utility for various applications, such as the operation of remote well controls.

The annulus can be used as a return path for fluids which have been transported to a remote location within the composite system. Porting between the two paths, either at the downstream end or intermediate locations will accomplish this.

Figure 16:
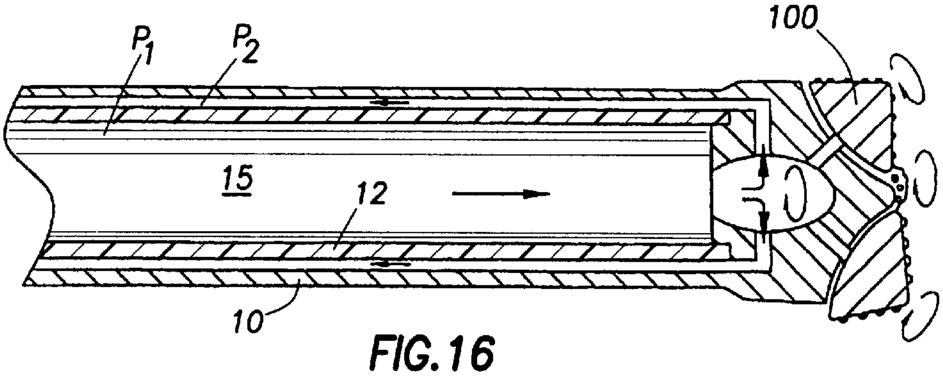
FIG. 16 is a side section view of a lined tubular with a primary center channel providing operating fluid to a hydraulic drill motor and the annulus between the liner and the host tubular providing a return path for the hydraulic fluid.

The path of the liner's interior may also contain a fluid at high pressure, and the annulus, the same fluid at a lower pressure. A practical application is the use of a high-efficiency hydraulic drill motor 100 at the downstream end of the tubular, shown in FIG. 16. Such a drill motor and other similar equipment require clean fluids for their operation. As shown in FIG. 16, the pressure $P_1$ in the interior volume 15 is higher than the pressure $P_2$ in the annulus.

Figure 17:
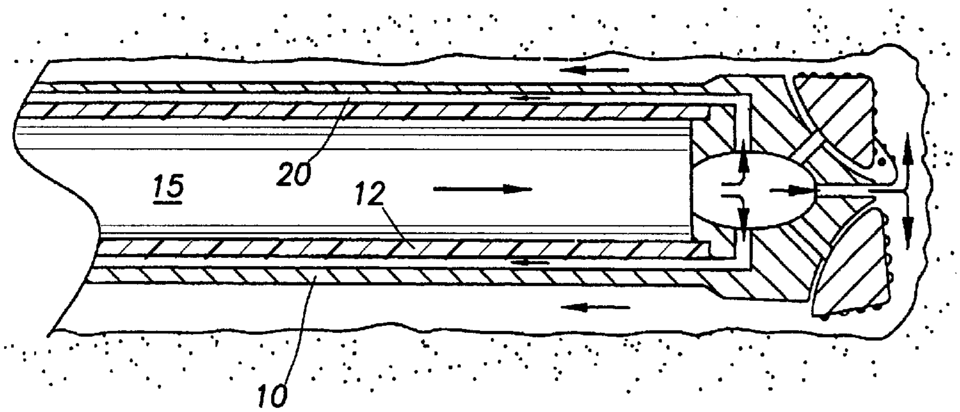
FIG. 17 is a side section view of a lined tubular illustrating return of fluid through channels in the liner and in the annulus around the drill string.

In a related application, the annular grooves will return only a portion of the fluid conveyed to the downstream end of the tubular. As previously, the fluid, could be used to power a drill motor. Drilling emulsion/mud, typical in the art, would be used to power a motor and cool the bit surfaces. Part of the fluid would be returned along the exterior of the composite tubular, as is typical. However, the balance would return through the annulus 20, as shown in FIG. 17. Porting of the fluid to the annulus may be accomplished within the tubular-drill motor assembly, or, in an the adjacent area. This ability facilitates under balanced drilling, which may be desirable, for example, to reduce formation pore damage.

Figure 18:
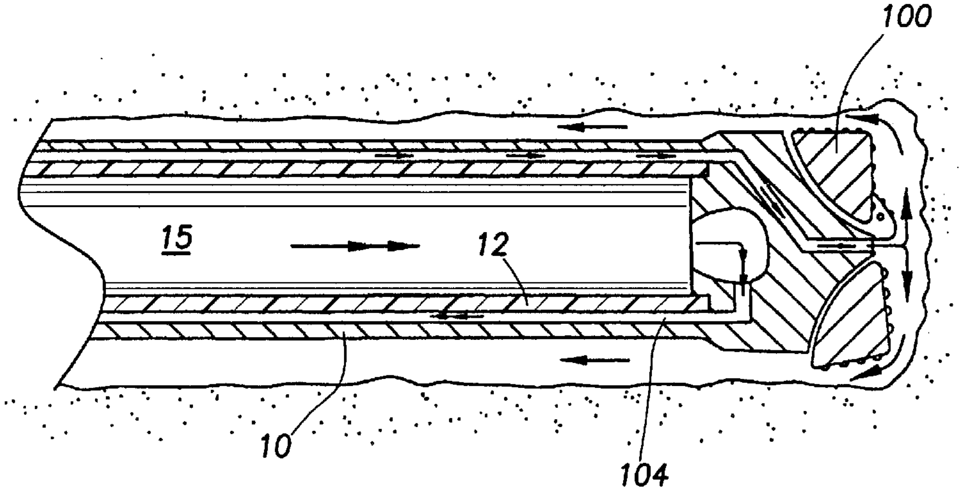
FIG. 18 is a side section view of a lined tubular illustrating fluid supply through the drill string and a channel in the liner and fluid return pathways in the annulus around the drill string and through a channel in the liner.

In yet another feature of the invention, multiple fluids may be circulated in the lined tubular having a continuous annulus, as shown in FIG. 18. In this case, operating fluid is provided to the drill bit for lubrication, cooling, and flushing of cuttings, through a channel 102, all of which is returned via the region around the composite assembly. Fluid through the interior volume 15 for powering a drill motor on continuous coiled tubing is returned via an annular channel 104. the pressure of the fluid within the liner must be equal to or greater than those within the annulus. One fluid (e.g., hydraulic oil) may, be used to power the drill motor, and one or more others (e.g., drilling mud, nitrogen, etc.) used to cool the bit and flush cuttings.

One utility of the invention in either of the two preceding cases is in underbalanced drilling applications, where return drilling fluid, particularly at excessive pressure, may damage the porosity of the geological production formation.

Another benefit, unachievable with existing liner systems, is the ability to determine the location of blockages in a lined tubular system by manipulation of fluid in a continuous annulus using the present invention. This ability is illustrated in FIG. 19. The utility of this aspect of the invention is in the transport of produced hydrocarbons, particularly those lines which may be prone to blockage from paraffin deposition and/or gas hydrate formation.

The determination of the location of a blockage may be accomplished in at least two ways using the annular fluid. First, volumetric measurement of annular fluid expressed can be performed in certain circumstances. Similarly, measurement of annular fluid flow rate conducted at a constant pressure can also be performed. Data gathered can be manipulated and mathematical interpolation will estimate the location of the blockage.

Figure 19C:
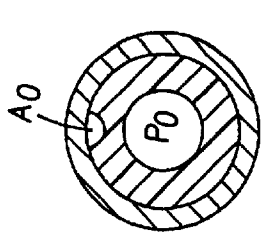
FIGS. 19*a* through 19*i* are side and section views of a lined tubular illustrating how the present invention may be used to determine the location of a blockage with drill pipe, such as with paraffin or other material.
Figure 19B:
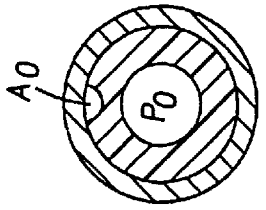
Figure 19A:
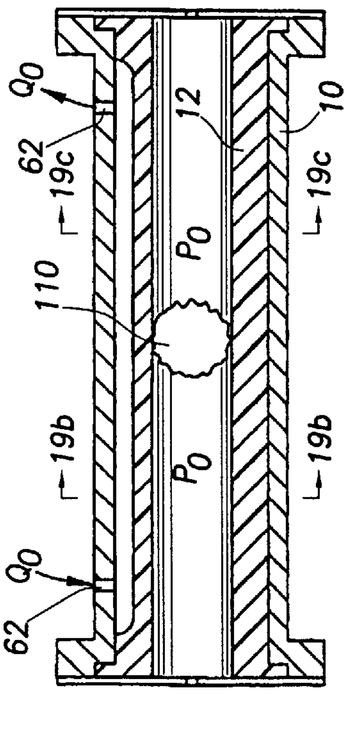

As shown in FIGS. 19*a* through 19*i*, when a block 110 is evident, the line is depressurized and vents 62 on both ends of the suspected location are opened to environmental pressure, as shown in FIG. 19*a*. The annular channels, relieved of stress, are thus permitted to expand to their maximum cross-sectional area, as shown in FIGS. 19*b* and 19*c*. In the flow rate method, a baseline measurement using one or more pre-determined pressures is taken, and the amount of fluid capable of passing through the annulus is determined, as $Q_0$. In the volumetric measurement, nothing more is done at this stage.

Figure 19F:
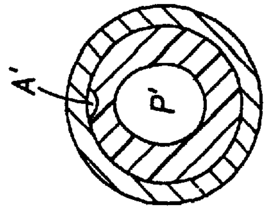
Figure 19E:
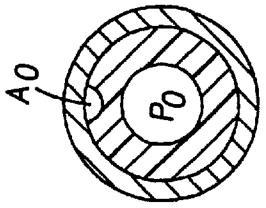
Figure 19D:
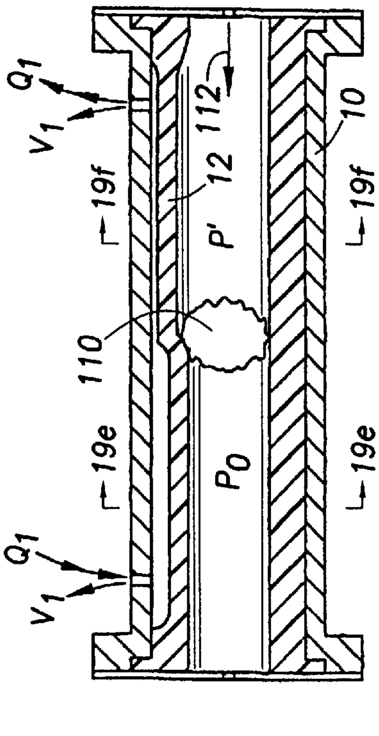

Next, the line is then pressurized from one side of the blockage only, as shown by an arrow 112 in FIG. 19*d*. Provided the pathway(s) are unobstructed, the rise in internal pressure will create a reduction in annular volume on the pressurized side of the blockage owing to the pressure on one side of the blockage only, as shown in FIGS. 19*e* and 19*f*. In the flow rate method, the above mentioned process is repeated. Due to the reduced cross sectional area, the flow rate will be diminished, as $Q_1$. In the volumetric method, the annular fluid expelled upon repressurization is measured, as $V_1$.

Figure 19I:
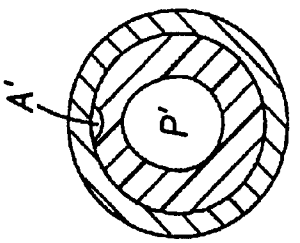
Figure 19H:
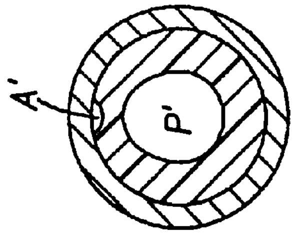
Figure 19G:
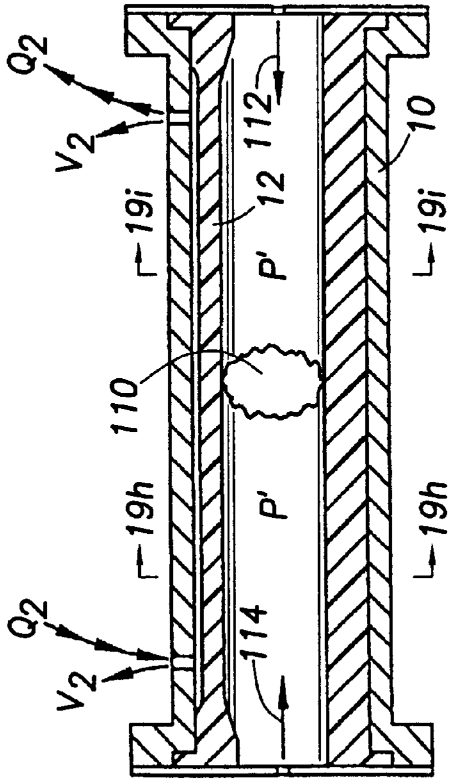

In the final step, the line pressure is equalized on both sides of the blockage, as shown in FIG. 19*g* and arrows 112 and 114. The annular cross section will be minimized on both sides of the blockage, as shown in FIGS. 19*h* and 19*i*. Repeating the process in the flow rate method, a further reduction will be seen, as $Q_2$. For the volumetric method, the remaining annular fluid expelled is measured, as $V_2$.

As the unit cross-section of the annular pathway is relatively consistent along the lined tubular for each of the embodiments, an interpolation of either volumetric, or flow rate method data can be made to approximate the position of the blockage.

In the volumetric method: $(V_1 \times \text{length of line})/(V_1+V_2) \equiv$ the distance from the initially pressurized end.

In the flow rate method: $((Q_0-Q_1)\times \text{length of line})/(Q_0-Q_2)\equiv$ the distance from the initially pressurized end.

A number of joining systems are applicable to the present invention. A major qualification of any effective joining system, for the enjoyment of the current invention, is the ready continuity of annular communication and fluid flow. Such designs may employ adaptations of common connections or specially designed for the specific application of this invention.

Figure 20:
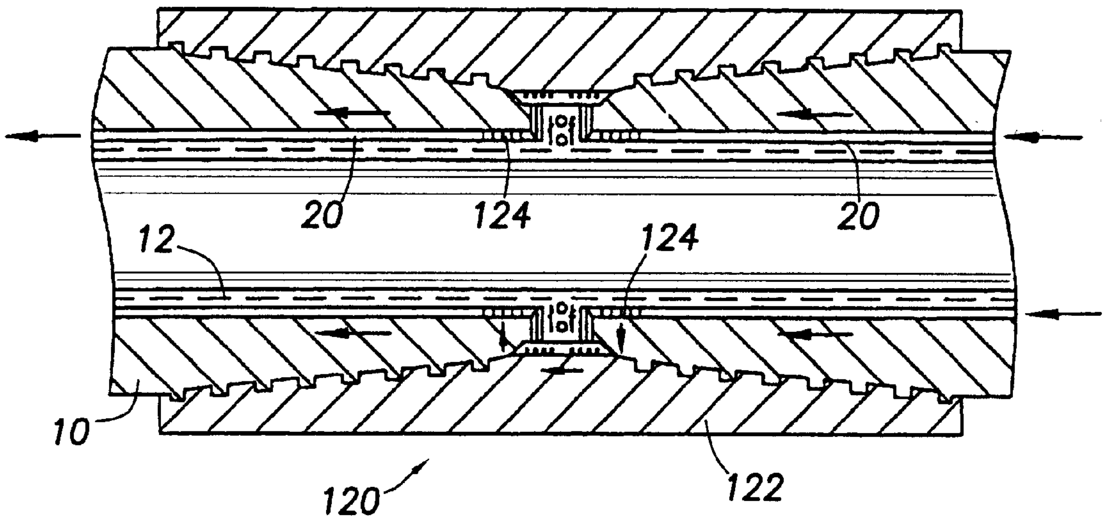
FIG. 20 is a side section view of a threaded connector for this invention.

FIG. 20 depicts a threaded coupling 120, in which adjoining ends of the host tubular 10 are threaded and tapered, and the joint is made by a collar 122. Continuity for a channel 20 is maintained across the coupling 120 by a surrounding mesh 124, in the nature of a mesh grommet.

Figure 21:
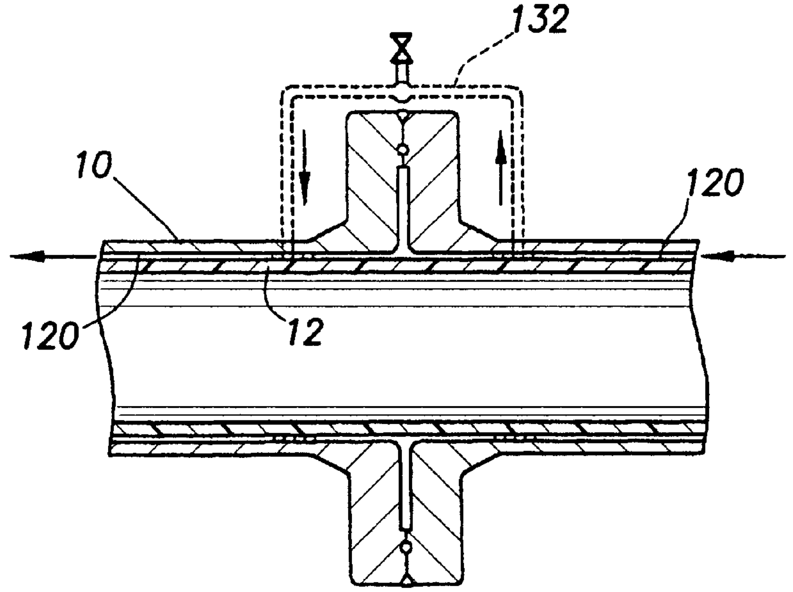
FIG. 21 is a side section view of a welded flange connector for this invention.

FIG. 21 depicts a welded coupling 130, in which adjoining ends of the tubular are welded together. In this case, continuity in the channel is provided by an exterior disposed loop 132 around the welded joint. In both cases, simple devices, e.g., screens, washers, tubing, etc., are employed to maintain annular continuity as required for the invention.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A composite downhole tubular system comprising:

a. a downhole host tubular;

b. a polymeric liner located in the host tubular and in partial abutting contact with host tubular; and c. a channel between the polymeric liner and the host tubular; and wherein the channel is formed by multiple non-contiguous protrusions extending from the liner toward the host tubular and created on the outer surface of the liner.

2. The system of claim 1, wherein the channel provides a path for the flow of an operational liquid.

3. The system of claim 1, further comprising a first channel for conducting fluid flow in one direction and a second channel for conducting fluid flow in a second direction.

4. The system of claim 1 wherein the channel is formed by multiple non-contiguous, crush-resistant protrusions extending from the liner toward the host tubular and created on the outer surface of the liner.

5. The system of claim 2, further comprising a port through the host tubular to control the pressure of the operational liquid to a pressure less than would cause collapse of the liner.

6. The system of claim 5, further comprising:

a. a tube coupled to the port and terminating at a point inside the liner; and b. a venturi nozzle on the end of the tube.

7. The system of claim 5, further comprising a. a riser coupled to the port;

b. an accumulator coupled to the riser; and c. a pump coupled to the accumulator, the pump providing sufficient pressure to the channel to maintain a minimum cross sectional area of the channel.

8. The system of claim 1, further comprising a non-compressible fluid filling the channel.

9. The system of claim 8, further comprising means to circulate the non-compressible fluid through the channel.

10. The system of claim 1, wherein the channel is formed by the deformation of the liner by a non-crushable member.

11. The system of claim 8, further comprising means for generating a measuring-while-drilling signal, and wherein the channel further serves at the communications channel for the measuring-while-drilling signal.

* * * * *